US010902279B2

(12) United States Patent
Tawari et al.

(10) Patent No.: US 10,902,279 B2
(45) Date of Patent: Jan. 26, 2021

(54) TRAINING SALIENCY

(71) Applicant: Honda Motor Co., Ltd., Tokyo (JP)

(72) Inventors: Ashish Tawari, Santa Clara, CA (US); Sujitha Catherine Martin, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 198 days.

(21) Appl. No.: 16/141,236

(22) Filed: Sep. 25, 2018

(65) Prior Publication Data
US 2020/0097754 A1    Mar. 26, 2020

(51) Int. Cl.
| | | |
|---|---|---|
| *G06K 9/46* | (2006.01) | |
| *G06K 9/62* | (2006.01) | |
| *G06K 9/00* | (2006.01) | |
| *G06N 3/08* | (2006.01) | |
| *G05D 1/02* | (2020.01) | |
| *G05D 1/00* | (2006.01) | |

(52) U.S. Cl.
CPC ......... *G06K 9/4671* (2013.01); *G05D 1/0088* (2013.01); *G05D 1/0221* (2013.01); *G05D 1/0246* (2013.01); *G06K 9/00791* (2013.01); *G06K 9/00845* (2013.01); *G06K 9/6256* (2013.01); *G06N 3/08* (2013.01); *G05D 2201/0212* (2013.01)

(58) Field of Classification Search
CPC ............. G06K 9/6256; G06K 9/00791; G06K 9/4671; G06N 3/08; G05D 1/0246; G05D 1/0221
See application file for complete search history.

(56) References Cited

U.S. PATENT DOCUMENTS

| 2015/0339589 A1* | 11/2015 | Fisher ................ G06K 9/00805 706/12 |
| 2016/0117947 A1* | 4/2016 | Misu .................... G09B 19/167 434/62 |
| 2019/0220029 A1* | 7/2019 | Fukuhara ........... G06K 9/00805 |

OTHER PUBLICATIONS

Szegedy et al., Going Deeper with Convolutions, 2015, IEEE Xplore, pp. 2,4 (Year: 2015).*
Pasanu et al., On the difficulty of training recurrent neural networks, 2013, Journal of Machine Learning Research, p. 5 (Year: 2013).*
(Continued)

*Primary Examiner* — Alan D Hutchinson
*Assistant Examiner* — Andy Schneider
(74) *Attorney, Agent, or Firm* — Rankin, Hill & Clark LLP

(57) ABSTRACT

Saliency training may be provided to build a saliency database, which may be utilized to facilitate operation of an autonomous vehicle. The saliency database may be built by minimizing a loss function between a saliency prediction result and a saliency mapper result. The saliency mapper result may be obtained from a ground truth database, which includes image frames of an operation environment where objects or regions within respective image frames are associated with a positive saliency, a neutral saliency, or a negative saliency. Neutral saliency may be indicative of a detected gaze location of a driver corresponding to the object or region at a time prior to the time associated with a given image frame. The saliency prediction result may be generated based on features extracted from respective image frames, depth-wise concatenations associated with respective image frames, and a long short-term memory layer or a recurrent neural network.

20 Claims, 14 Drawing Sheets

(56) References Cited

OTHER PUBLICATIONS

S. Alletto, A. Palazzi, F. Solera, S. Calderara, and R. Cucchiara, "Dr (eye) ve: a dataset for attention-based tasks with applications to autonomous and assisted driving," in Computer Vision and Pattern Recognition Workshops (CVPRW), 2016 IEEE Conference on. IEEE, 2016, pp. 54-60.
L. Bazzani, H. Larochelle, and L. Torresani, "Recurrent mixture density network for spatiotemporal visual attention," arXiv preprint arXiv:1603.08199, 2016.
Z. Bylinskii, T. Judd, A. Oliva, A. Torralba, and F. Durand, "What do different evaluation metrics tell us about saliency models?" arXiv preprint arXiv:1604.03605, 2016.
L. Castrejón, K. Kundu, R. Urtasun, and S. Fidler, "Annotating object instances with a polygon-rnn," in CVPR, vol. 1, 2017, p. 2.
M. Cornia, L. Baraldi, G. Serra, and R. Cucchiara, "Predicting human eye fixations via an lstm-based saliency attentive model," arXiv preprint arXiv:1611.09571, 2016.
A. Doshi and M. M. Trivedi, "Head and eye gaze dynamics during visual attention shifts in complex environments," Journal of vision, vol. 12, No. 2, pp. 9-9, 2012.
Y. Huang, M. Cai, Z. Li, and Y. Sato, "Predicting gaze in egocentric video by learning task-dependent attention transition," arXiv preprint arXiv:1803.09125, 2018.
L. Itti and C. Koch, "A saliency-based search mechanism for overt and covert shifts of visual attention," Vision research, vol. 40, No. 10, pp. 1489-1506, 2000.
T. Judd, F. Durand, and A. Torralba, "A benchmark of computational models of saliency to predict human fixations," in MIT Technical Report, 2012.
M. Kümmerer, T. S. Wallis, and M. Bethge, "Deepgaze ii: Reading fixations from deep features trained on object recognition," arXiv preprint arXiv:1610.01563, 2016.
S. Martin and A. Tawari, "Object of fixation estimation by joint anal-ysis of gaze and object dynamics," in Intelligent Vehicles Symposium, 2018 IEEE. IEEE, 2018.
P. O. Pinheiro, T.-Y. Lin, R. Collobert, and P. Dollár, "Learning to refine object segments," in European Conference on Computer Vision. Springer, 2016, pp. 75-91.
V. Ramanishka, Y.-T. Chen, T. Misu, and K. Saenko, "Toward Driving Scene Understanding: A Dataset for Learning Driver Behavior," in CVPR, 2018.
R. Rukšėnas, J. Back, P. Curzon, and A. Blandford, "Formal modelling of salience and cognitive load," Electronic Notes in Theoretical Computer Science, vol. 208, pp. 57-75, 2008.
Y. Seya, H. Nakayasu, and T. Yagi, "Useful field of view in simulated driving: Reaction times and eye movements of drivers," i-Perception, vol. 4, No. 4, pp. 285-298, 2013.
K. Simonyan and A. Zisserman, "Very deep convolutional networks for large-scale image recognition," arXiv preprint arXiv:1409.1556, 2014.
B. W. Tatler, M. M. Hayhoe, M. F. Land, and D. H. Ballard, "Eye guidance in natural vision: Reinterpreting salience," Journal of vision, vol. 11, No. 5, pp. 5-5, 2011.
A. Tawari and B. Kang, "A computational framework for driver's visual attention using a fully convolutional architecture," in IEEE Intelligent Vehicles Symposium (IV), 2017, pp. 887-894.
S. Xingjian, Z. Chen, H. Wang, D.-Y. Yeung, W.-K. Wong, and W.-c. Woo, "Convolutional lstm network: A machine learning approach for precipitation nowcasting," in Advances in neural information processing systems, 2015, pp. 802-810.
A. L. Yarbus, Eye-Movements and Vision. Plenum Press, 1967.

* cited by examiner

TRAINING SALIENCY

BACKGROUND

Driving is primarily a visual task. Drivers need to maintain constant vigilance of multiple information sources, which may change dynamically. This may require rapid processing, especially at and/or around roadway intersections. A general representation of gaze behavior may be provided in the form of a saliency map. When looking to a static or a dynamic scene, an expert driver can rapidly direct his or her gaze to select visual information of interest and make decisions for safe driving. However, what, when, where, how, and/or why a driver looks around or sees what he or she sees is an intriguing problem that is still far from being fully understood.

BRIEF DESCRIPTION

According to one aspect, a system for training saliency may include a ground truth database, a saliency estimation system, and a loss minimizer. The saliency estimation system may include a feature extractor, a depth-wise concatenator, and a saliency predictor. The ground truth database may include a first image frame of an operation environment in association with a vehicle operated by a driver at a first time, a second image frame of the operation environment in association with the vehicle operated by the driver at a second time, and a saliency mapper result. The first image frame and the second image frame may each include a detected gaze location of the driver and an object or a region. The saliency mapper result may include one or more of the following associated with the object or region of the second image frame: a positive saliency, a neutral saliency, or a negative saliency. The positive saliency may be indicative of the detected gaze location of the driver corresponding to the object or region at the second time. The neutral saliency may be indicative of the detected gaze location of the driver corresponding to the object or region at the first time. The negative saliency may be any region not coinciding with the positive saliency or neutral saliency. The feature extractor may extract features for the first image frame and the second image frame at two or more levels based on a convolutional neural network (CNN). The depth-wise concatenator may concatenate two or more of the levels associated with the first image frame and two or more of the levels associated with the second image frame. The saliency predictor may generate a saliency prediction result based on the extracted features for the first image frame and the second image frame, the depth-wise concatenations associated with the first image frame and the second image frame, and a long short-term memory (LSTM) layer. The loss minimizer may generate a saliency database by minimizing a loss function calculated between the saliency prediction result and the saliency mapper result. The saliency database may be configured to be transmitted, at least in part, to an autonomous vehicle.

The system for training saliency may include a gaze detection sensor detecting the detected gaze location of the driver at the first time for the first image frame and at the second time for the second image frame. The object or the region may be a manually annotated object, an annotated region, an instance level segmented object, or an intersection over union (IOU) object. The system for training saliency may include an instance level segmenter defining the instance level segmented object of the first image frame or the second image frame. The system for training saliency may include an image capture sensor 102 capturing the first image frame and the second image frame of the operation environment. The system for training saliency may include an observation controller selecting the first image frame from a series of image frames based on a change in velocity of the vehicle or a change in brake pressure of the vehicle. The system for training saliency may include a remote server storing the generated saliency database.

The saliency predictor may generate the saliency prediction result based on a convolution LSTM layer or two or more LSTM layers. The saliency predictor may generate the saliency prediction result based on a dropout layer. The saliency predictor may generate the saliency prediction result based on a first convolution LSTM, a dropout layer, and a second convolution LSTM layer. The saliency predictor may generate the saliency prediction result based on a recurrent neural network (RNN).

The first image frame of the operation environment may be an image of an intersection between a first roadway and a second roadway. The first image frame of the operation environment may be an image of an intersection including a four-way stop. The first image frame of the operation environment may be an image of an intersection including a pedestrian crossing.

According to one aspect, an autonomous vehicle operating based on a saliency database trained in accordance with a system for training saliency may include a communications interface, one or more vehicle systems, and a controller. The communications interface may receive information from the saliency database. The controller may control one or more of the vehicle systems in an autonomous fashion based on the saliency database. The saliency database may be trained based on minimizing a loss function calculated between a saliency prediction result from a saliency estimation system and a saliency mapper result from a ground truth database. The saliency prediction result may be generated based on features extracted from a first image frame and from features extracted from a second image frame, depth-wise concatenations associated with the first image frame and the second image frame, and a long short-term memory (LSTM) layer. The first image frame and the second image frame may each include a detected gaze location of a training driver and an object or a region of a training operation environment in association with a training vehicle operated by the training driver. The saliency mapper result may include one or more of the following associated with the object or region of the second image frame: a positive saliency, a neutral saliency, or a negative saliency. The positive saliency may be indicative of the detected gaze location of the training driver corresponding to the object or region at a second time. The neutral saliency may be indicative of the detected gaze location of the training driver corresponding to the object or region at a first time. The negative saliency may be any region not coinciding with the positive saliency or neutral saliency.

The autonomous vehicle may include an image capture device capturing an image frame of an operation environment through which the autonomous vehicle is travelling. The image frame may include an object or a region. The controller may associate an artificial intelligence saliency indicative of a region of interest corresponding to the object or region at a current time based on the saliency database. The autonomous vehicle may include a display displaying the image frame and the region of interest as a marked region within the image frame. The controller may control one or more of the vehicle systems in the autonomous fashion based on the region of interest.

According to one aspect, a system for training saliency may include a ground truth database, a saliency estimation system, and a loss minimizer. The saliency estimation system may include a feature extractor, a depth-wise concatenator, and a saliency predictor. The ground truth database may include a first image frame of an operation environment in association with a vehicle operated by a driver at a first time, a second image frame of the operation environment in association with the vehicle operated by the driver at a second time, and a saliency mapper result. The first image frame and the second image frame may each include a detected gaze location of the driver and an object or a region. The saliency mapper result may include one or more of the following associated with the object or region of the second image frame: a positive saliency, a neutral saliency, or a negative saliency. The positive saliency may be indicative of the detected gaze location of the driver corresponding to the object or region at the second time. The neutral saliency may be indicative of the detected gaze location of the driver corresponding to the object or region at the first time. The negative saliency may be any region not coinciding with the positive saliency or neutral saliency. The feature extractor may extract features for the first image frame and the second image frame at two or more levels based on a convolutional neural network (CNN). The depth-wise concatenator may concatenate two or more of the levels associated with the first image frame and two or more of the levels associated with the second image frame. The saliency predictor may generate a saliency prediction result based on the extracted features for the first image frame and the second image frame, the depth-wise concatenations associated with the first image frame and the second image frame, and a recurrent neural network (RNN). The loss minimizer may generate a saliency database by minimizing a loss function calculated between the saliency prediction result and the saliency mapper result.

DETAILED DESCRIPTION

Figure 1:
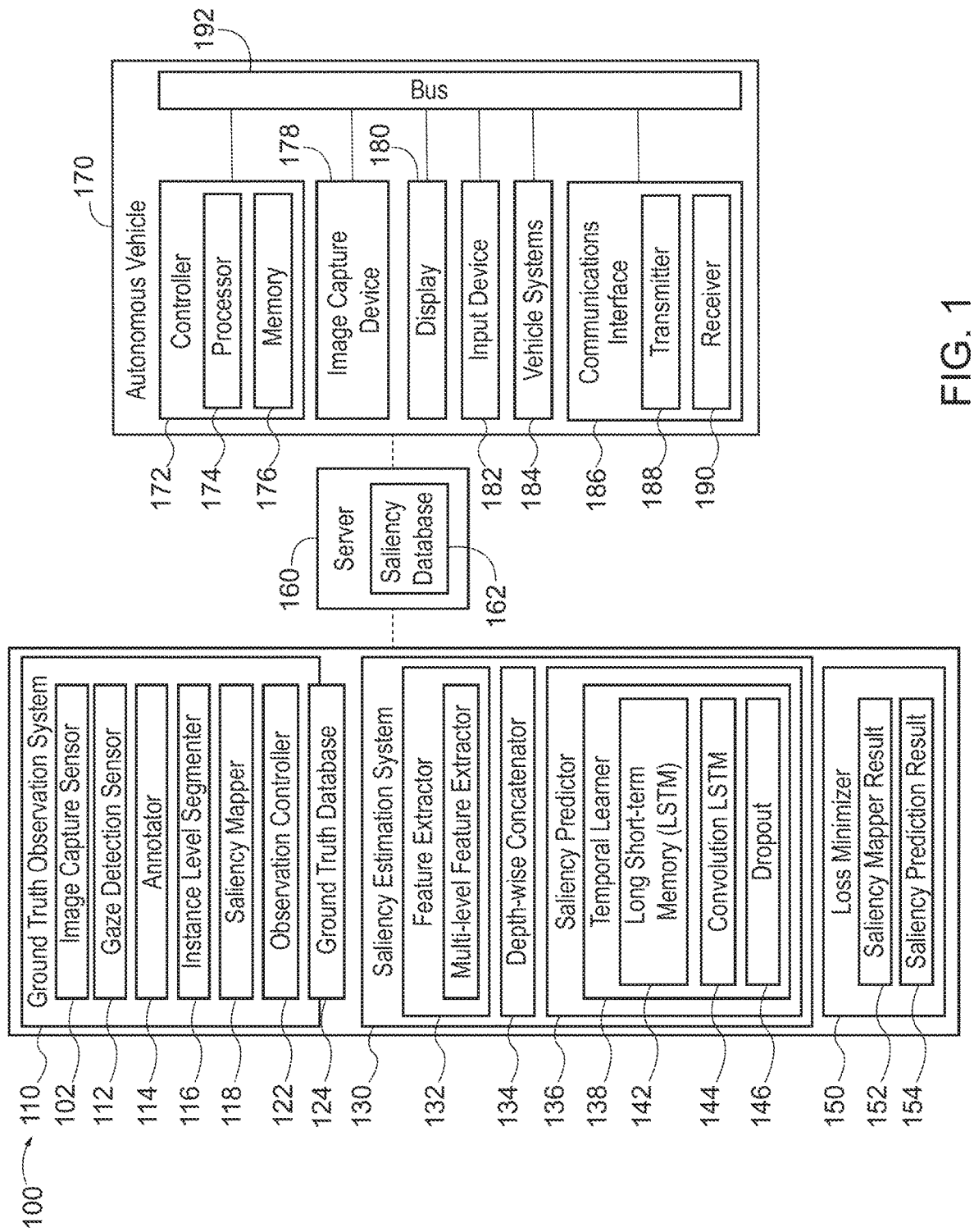
FIG. 1 is an exemplary component diagram of a system for training saliency and an autonomous vehicle operating based thereon, according to one aspect.

The following terms are used throughout the disclosure, the definitions of which are provided herein to assist in understanding one or more aspects of the disclosure.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface. In this regard, one or more of the components of FIG. 1 may be operably connected and perform computer communication with one another.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., image capture systems, camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an exemplary component diagram of a system for training saliency and an autonomous vehicle operating based thereon, according to one aspect. The system for training saliency may be a system which trains the artificial intelligence or a neural network of the autonomous vehicle to attend to targets, such as objects, zones, regions, using a recurrent neural network (RNN), which may be a fully convolutional RNN or a recursive neural network. The system for training saliency may include an image capture sensor 102, a ground truth observation system 110, which may include a gaze detection sensor 112, an annotator 114, an instance level segmenter 116, a saliency mapper 118, an observation controller 122, and a ground truth database 124. The system for training saliency may include a saliency estimation system 130, which may include a feature extractor 132, a depth-wise concatenator 134, and a saliency predictor 136 including a temporal learner 138. The saliency predictor 136 may include a long short-term memory (LSTM) layer 142, a convolution LSTM layer 144, and/or a dropout layer 146. The system for training saliency may include a loss minimizer 150, which receives a result of the saliency mapper 118 (saliency mapper result 152) from the ground truth observation system 110 and a result from the saliency predictor 136 (saliency prediction result 154).

The ground truth observation system 110 generates the ground truth database 124, which is indicative of when and where a training driver looks or focuses on a given object, zone, region (e.g., targets) within a driving environment or an operating environment. The saliency estimation system 130 uses the RNN or the recursive neural network, such as one or more LSTM layers 142, one or more convolution LSTM layers 144, and/or the dropout layer 146 to estimate the saliency prediction result 154. By minimizing the loss between the saliency prediction result 154 and the saliency mapper result 152 from the ground truth database 124, a saliency model or the saliency database may be trained to mimic an experienced driver. In other words, the saliency database may be indicative of or may include the saliency model which may enable a controller of a vehicle, such as an autonomous vehicle 170 or with regard to an advanced driver assistance system (ADAS), to mimic an expert driver's gaze behavior, using a deep learning framework, and capable of handling time sequence image data. Stated another way, the saliency database may be used to replicate a driver's attention behavior, as trained according to the ground truth database 124.

The ground truth observation system 110 may be setup using a simulation setup or in a real-world training setup. Additionally, the ground truth database 124 may be setup or trained using a number of training drivers. Further, results may be screened from the ground truth database 124 so that merely the desired results are recorded to the ground truth database 124. Accordingly, different subjects may be used to train the ground truth database 124 and perhaps using the same training environment or corresponding route.

In this regard, in generating the ground truth database 124, the ground truth observation system 110 may be outfitted on a training vehicle, and use the image capture sensor 102 to capture image frames or video of the driving environment or the operating environment through which the training vehicle is travelling. In this way, the image capture sensor 102 may be a vehicle mounted camera or sensor facing a forward driving direction, and may capture images similar to what the training driver of the training vehicle may see while he or she is operating the training vehicle, such as by capturing a first image frame and a second image frame (of a series of image frames as part of a video frame) of the operation environment.

The training vehicle may also be outfitted with the gaze detection sensor 112, which may be an eye tracking device which detects a gaze location associated with the driver of the training vehicle (e.g., the training driver). In this training phase, expert drivers may be selected and instructed to drive or operate the training vehicle along one or more predefined routes or roadways. Because the ground truth database 124 may be based on active-gaze behavior (e.g., behavior associated with a driving task), the predefined routes may include a variety of driving scenarios, such as intersections. Intersections may be of interest because the training drivers may seek information around intersection to maneuver with other traffic participants. These predefined routes may include an intersection between a first roadway and a second roadway, an intersection including a four-way stop, an intersection including a pedestrian crossing, a roundabout, a traffic circle, etc. For example, an intersection may be defined to include a region prior to passing (e.g., approaching the intersection) and a region after passing the intersection (e.g., leaving the intersection). Thus, the ground truth observation system 110 may merely sample data associated with active-gaze (e.g., gaze associated with driving related task) behavior for the training drivers.

In this regard, the image capture sensor 102 may capture a series of image frames (e.g., a first image frame, a second image frame, a third image frame) at a series of times (e.g., a first time, a second time, a third time . . . ) of the operation environment. Together, the series of image frames may be played as a video clip, for example. The gaze detection sensor 112 may detect the gaze location of the training driver of the training vehicle at the respective times (e.g., the first time, the second time, the third time, etc.). In this way, each image frame of the operating environment may be associated with a detected gaze location and a corresponding time. For example, the gaze detection sensor 112 may detect the detected gaze location of the training driver at the first time for the first image frame and at the second time for the second image frame.

According to one aspect, the observation controller 122 may filter or remove captured image frames or other associated data based on that image frame not being associated with active-gaze behavior. For example, the observation controller 122 may maintain the ground truth database 124 by selecting image frames from the series of image frames based on a change in velocity of the training vehicle or a change in brake pressure of the training vehicle. Stated another way, because drive segments around intersections often involve a change in a brake profile or a change in a velocity profile or other associated driving data, this change in vehicle dynamics by the training driver (e.g. the change in brake pedal pressure) may correlate to the change in the perception of external stimuli (e.g. slowing down of another vehicle) or internal stimuli (e.g. turning of the training vehicle) and thus, perception of such stimuli may have an accompanied active-gaze behavior. Explained yet again, the recorded reaction of the change in velocity or braking pressure may be taken to be the training driver reacting to and/or attending to a stimulus. In this way, the observation controller 122 may select the first image frame from a series of image frames based on a change in velocity of the training vehicle or a change in brake pressure of the training vehicle.

Additionally, each image frame of the operating environment may include an object, a zone, or a region. The annotator 114 may be utilized to annotate, associate, mark, or flag the object, region, or zone. For example, the annotator 114 may enable manual annotation to occur so that object-level saliency boundaries are tied to a semantic meaning of a corresponding object. The annotator 114 may annotate objects and/or regions within the image frames. Examples of objects may include other vehicles, pedestrians, traffic signs, etc. Examples of regions may include a roadway, pedestrian crossings, portions of the intersection, entry points, exit points, a lane, a lane marker, etc. The annotator 114 may enable a bounding box to be associated with an object or a region for a given image frame. According to one aspect, the bounding box may be represented as a set of coordinates and is not necessarily represented in a graphical manner. Additionally, there may be scenarios where no bounding box is assigned by the annotator 114 when the corresponding gaze detection location is unclear or if no fixation is occurring. The annotator 114 may, according to other aspects, automatically annotate the objects or regions within the image frames of the operating environment.

The instance level segmenter 116 may augment the image frames with automatic detection of an object of fixation, as determined by the detected gaze location from the gaze detection sensor 112. If no object of fixation is detected, the saliency mapper 118 may generate a pixel-level saliency map, such as a map based on a Gaussian filter centered about the detected gaze location. Therefore, both object-level and pixel level information may be included in the ground truth database 124. According to one aspect, the instance level segmenter 116 may define the instance level segmented object of the first image frame or the second image frame. Thus, the object or region may be a manually annotated object, an annotated region, an instance level segmented object, or another type of artificial intelligence or machine learning recognized object, such as an intersection over union (IOU) object.

According to one aspect, a location, absolute location, or position information associated with the object may be provided as part of the setup of the ground truth observation system 110, which may be utilized by the ground truth observation system 110 to determine a relevance associated with the object according to a driving context during the training phase.

According to one aspect, a planned route associated with the training vehicle may be recorded along with the image frame. Explained in greater detail, the training driver, if making a right turn, may merely be focused on traffic coming from the left, and thus this planned right turn may influence the training driver's gaze behavior. Therefore, the ground truth database 124 and/or the generated saliency database may take these types of actions into account with different classifications for different associated anticipated driving maneuvers known during the training phase. Stated another way, the ground truth database 124 may include a section or a table associated with the aforementioned information (e.g., the image frames, gaze locations, etc.) with respect to right turns at an intersection or with respect to different scenarios.

In this way, the ground truth observation system 110 may generate the ground truth database 124 to include objects or regions within image frames which are annotated, such as with the above-described bounding box. These objects or regions may be segmented (e.g., by the instance level segmenter 116) and tracked. Track IDs may be generated for respective objects or regions by the instance level segmenter 116. According to one aspect, the ground truth database 124 may include the track IDs for respective objects or the associated segmentation information. The image frames of the ground truth database 124 may include ground truth saliency map information which is indicative of pixel-by-pixel saliency for the training driver within that image frame.

A series of image frames may form a video clip. For an image frame of the ground truth database 124 that image frame includes x by y pixels, each pixel may be marked, flagged, or associated with a saliency value. Examples of saliency values may be a positive saliency, a neutral saliency, and a negative saliency. The positive saliency may be indicative of the detected gaze location or the determined object of fixation of the training driver corresponding to a given pixel, object, zone, or region at a current time. Pixels associated with a target of fixation or the detected gaze location may be treated as salient pixels or associated with the positive saliency. The neutral saliency may be indicative of the detected gaze location or the determined object of fixation of the training driver corresponding to a given pixel, object, zone, or region at a previous time associated with a previous image frame. Stated another way, if the training driver looked at an object at time t, then at time t+1, the neutral saliency may be associated with the object which was viewed at time t. The negative saliency may be any region not coinciding with the positive saliency or neutral saliency.

Explained in terms of a first image frame of an operation environment in association with a training vehicle operated by a training driver at a first time, a second image frame of the operation environment in association with the training vehicle operated by the training driver at a second time, and where the first image frame and the second image frame each include a detected gaze location of the training driver and an object or a region, the positive saliency may be indicative of the detected gaze location of the training driver corresponding to the object or region at the second time, the neutral saliency may be indicative of the detected gaze location of the training driver corresponding to the object or region at the first time, and the negative saliency may be any region not coinciding with the positive saliency or neutral saliency.

The neutral saliency may be defined as a non-negative saliency, which may be treated as suppressed. Because human vision is limited to seeing one location at a time, humans generally compensate for this by allocating their gaze at different locations temporally. While a target or object in the distance is seemingly ignored (i.e., gaze not directly fixated on the target), this is not necessarily the case because the object may be tracked through peripheral vision, for example. Therefore, the model generated by the system for training saliency accounts for this temporal allocation by including the neutral saliency or non-negative saliency in the saliency model of the saliency database.

In this way, the ground truth database 124 may include ground truth saliency information for each image frame of a video frame, such as, for example, a first image frame of the operation environment in association with the training vehicle operated by the training driver at a first time, a second image frame of the operation environment in association with the training vehicle operated by the training driver at a second time. The first image frame and the second image frame may each include the detected gaze location of the training driver and the corresponding object or region.

The ground truth saliency information may include three types of information: a positive pixel corresponding to an instantaneous target-of-fixation location, a neutral-pixel corresponding to a previously tracked target-of-fixation (e.g., other than instantaneous), and a negative-pixel corresponding to the rest of the locations. The saliency mapper 118 of the ground truth observation system 110 may provide data (e.g., the saliency mapper result 152) from the ground truth database 124 to the loss minimizer 150. In this way, the saliency mapper result 152 may classify pixels or objects within the image frame as the positive saliency, the neutral saliency, or the negative saliency. According to one aspect, the saliency mapper result 152 may be stored in the ground truth database 124 (i.e., the ground truth database 124 may include the saliency mapper result 152). The saliency predictor 136 of the saliency estimation system 130 may also provide a result (e.g., the saliency prediction result 154) to the loss minimizer 150, as will be discussed below.

The saliency estimation system 130 may be a system which predicts saliency information or saliency map information for image frames of a video frame when given current and previous red-green-blue (RGB) image frames, such as during a learning phase. The architecture of the saliency estimation system 130 may be seen in FIG. 1 and in greater detail in FIG. 8. The saliency estimation system 130 may have the recurrent neural network (RNN) architecture, which may be a fully convolutional RNN or a fully convolutional recursive neural network. Additionally, the saliency estimation system 130 may receive a convolutional neural network (CNN) based image frame as an input and provide the saliency prediction result 154 as an output.

As previously discussed, the saliency estimation system 130 may include the feature extractor 132, the depth-wise concatenator 134, and the saliency predictor 136. The feature extractor 132 may extract image representations of image frames and be a multi-level feature extractor. For example, the feature extractor 132 may extract features for the first image frame at two or more levels based on the CNN and features for the second image frame at two or more levels based on the CNN. According to one aspect, the feature extractor 132 may implement pre-trained neural networks, such as VGG-16 (Visual Geometry Group) or a modified VGG-16 architecture to extract features of image frames pooled at one or more different levels. For example, the modified VGG-16 architecture may extract image features pooled at four different levels of the CNN architecture to obtain different degrees of feature abstraction. The pooled features may represent local information of the image frame at lower levels of a deep neural network (DNN) and capture global information at deeper levels.

According to one aspect, the features from three pool layers may be concatenated depth-wise by the depth-wise concatenator 134 upon up-sampling or down-sampling an output of a pool layer. This concatenation may be utilized to obtain both a global sense and a local sense of the features during the learning phase. In other words, the depth-wise concatenator 134 may concatenate two or more of the levels associated with the first image frame and two or more of the levels associated with the second image frame. Batch normalization may be applied before one or more of the convolutional layers to facilitate faster convergence by reducing internal covariate shift. Rectified Linear Units (RLU) may be used as an activation at one or more of the convolutional layers to introduce non-linearity.

The saliency predictor 136 may receive the features extracted by the feature extractor 132 and pass the received features through the temporal learner 138 block to produce the saliency prediction result 154. According to one aspect, the temporal learner 138 may include a first convolution LSTM cell, a dropout cell, and a second convolution LSTM cell. The dropout cell may be sandwiched between the first convolution LSTM cell and the second convolution LSTM cell. According to one aspect, the saliency predictor 136 may generate the saliency prediction result 154 based on a convolution LSTM layer, two or more LSTM layers, a first convolution LSTM, a dropout layer, a second convolution LSTM layer, a recurrent neural network (RNN), or any combination thereof. According to one aspect, the saliency predictor 136 may generate the saliency prediction result 154 based on the extracted features for the first image frame and the second image frame, the depth-wise concatenations associated with the first image frame and the second image frame, and one or more of the LSTM layers.

According to one aspect, convolution LSTM cells or layers may be utilized within the temporal learner 138 block because convolution LSTM cells or layers may model the temporal information for predicting saliency at time t and because the convolution makes the cells operate in 2D, which preserves spatial information received from the image representation front end. Additionally, convolution LSTM cells or layers may reduce a number of parameters to be learned compared to simple (e.g., fully-connected) LSTM.

During the training phase or the learning phase, a weighted mean square loss function may be optimized, such as using an Adadelta optimizer or other optimizer. For example, parameters may be learned via minimizing the loss function, which may be computed as an error between the estimated or predicted saliency map (e.g., the saliency prediction result 154 from the saliency predictor 136) and the ground truth (e.g., the saliency mapper result 152 from the ground truth observation system 110 or database). In this way, the loss minimizer 150 may generate a saliency database 162 by minimizing the loss function calculated between the saliency prediction result 154 and the saliency mapper result 152. A remote server 160 may be utilized to store the generated saliency database 162. The saliency database may be configured to be transmitted, at least in part, to the autonomous vehicle 170.

The autonomous vehicle 170 may operate based on the saliency database, which was trained in accordance with the system for training saliency. The autonomous vehicle 170 may include a controller 172, which may have a processor 174 and a memory 176. The autonomous vehicle 170 may include an image capture device 178, a display 180, an input device 182, one or more vehicle systems 184, a communications interface 186 including a transmitter 188 and a receiver 190 (e.g., enabling information from the saliency database 162 to be received), and a bus 192 communicatively coupling respective components.

As previously discussed, the autonomous vehicle 170 may operate according to the trained saliency database, which enables the autonomous vehicle 170 to 'look' around the same way an experienced driver would. In this regard, the image capture device 178 may capture an image frame of the operating environment associated with the autonomous vehicle 170 and the receiver of the communications interface may receive information from the saliency database. The controller 172 may control one or more of the vehicle systems 184 of the autonomous vehicle 170 in an autonomous fashion based on the information received from the saliency database and based on an image of the operating environment captured by the image capture device 178.

The saliency database may represent or be indicative of how an experienced driver would react or would have gaze fixations given a real-world driving scenario. In other words, once the saliency database is generated, it may be used by the controller 172 of the autonomous vehicle 170 to predict a driver's saliency map based on a given operating environment image frame. Explained yet again, the controller 172 may predict, in a driving scene video, objects or regions which would attract the attention of an expert or experienced driver's gaze based on the corresponding image frame and the saliency database as inputs.

The saliency database may be trained based on minimizing the loss function calculated between the saliency prediction result 154 from the saliency estimation system 130 and the saliency mapper result 152 from the ground truth database 124. The saliency prediction result 154 may be generated based on features extracted from the first image frame and from features extracted from the second image frame, depth-wise concatenations associated with the first image frame, depth-wise concatenations associated with the second image frame, and one or more LSTM (or convolution LSTM) layers or cells, as will be described in greater detail with reference to FIG. 7. The first image frame and the second image frame may each include the detected gaze location of the training driver and the object or region of the training operation environment in association with the training vehicle operated by the training driver.

The saliency mapper result 152 may include one or more of the following associated with the object or region of the second image frame: a positive saliency, a neutral saliency, or a negative saliency. The positive saliency may be indicative of the detected gaze location of the training driver corresponding to the object or region at the second time, the neutral saliency may be indicative of the detected gaze location of the training driver corresponding to the object or region at the first time, and the negative saliency may be any region not coinciding with the positive saliency or neutral saliency.

According to one aspect, the autonomous vehicle 170 may display a region of interest within the operating environment based on the captured image frame of the operating environment and based on the information from the saliency database. In other words, the controller 172 of the autonomous vehicle 170 may predict a saliency map or other saliency information based on the information from the saliency database and/or based on other information, such as an image frame of the operation environment as captured by the image capture device 178 of the autonomous vehicle 170 (e.g., given a sequence or a series of image frames). Explained another way, the autonomous vehicle 170 may utilize the information from the saliency database in conjunction with other inputs, such as the image frame of the operating environment of the autonomous vehicle 170 captured by the image capture device 178, a global positioning system (GPS), a planned navigation or route associated with the GPS, other sensors (radar or LIDAR, etc.) to display to a user where the autonomous vehicle 170 is 'looking'. This area where the autonomous vehicle 170 is 'looking' may be defined as a region of interest.

For example, the image capture device 178 may capture the image frame of the operation environment through which the autonomous vehicle 170 is travelling, and the image frame may include an object or a region. The controller 172 of the vehicle may utilize the saliency database to associate an artificial intelligence saliency indicative of the region of interest with the object or the region. This artificial intelligence saliency may be associated with the object or the region in real time or at a current time based on the information from the saliency database. Additionally, the display 180 may display the image frame and the region of interest as a marked region within the image frame. In this way, the controller 172 of the autonomous vehicle 170 may provide an explanation or a notification associated with decisions being made in terms of saliency, or awareness, of objects the controller 172 to which the autonomous vehicle 170 is attending.

Further, the controller 172 may control one or more of the vehicle systems 184 in an autonomous fashion based on the region of interest. For example, if the region of interest is another vehicle preparing to merge into a current lane of the autonomous vehicle 170, the autonomous vehicle 170 may adjust its lane position (e.g., by initiating an autonomous lane change) or velocity (e.g., by initiating an autonomous braking action) accordingly.

In this way, active-gaze behavior (e.g., gaze pertaining to driving), pixel-level and object-level information, and suppression of non-negative pixels (e.g., the neutral pixels or the neutral saliency) may be provided in the saliency maps generated based on the saliency database by the controller 172 of the autonomous vehicle 170. The neutral saliency pixels or objects and object-level saliency ground truth dataset from the ground truth database 124 may be generated using real-world driving data around training traffic intersections. According to one aspect, the fully convolutional RNN architecture of the system for saliency generation may be capable of handling time sequence image data to estimate the saliency map based on the saliency database. RGB image sequence data may be provided as the network input for the ground truth observation system 110 and/or the autonomous vehicle 170 system using the trained saliency database.

According to one aspect, the controller 172 of the autonomous vehicle 170 may receive image frames from the image capture device 178 and saliency information from the saliency database, as well as gaze detection information from the vehicle systems 184, which may include sensors, such as a gaze detection device. If the driver of the autonomous vehicle 170 is operating the autonomous vehicle 170 in a manual mode, and the gaze detection device detects that the driver has not identified or fixated on an object in the operating environment which, according to the saliency database, would have been attended to based on the resulting predicted saliency map, the display 180 of the autonomous vehicle 170 or other output device may notify the driver of the presence of the object.

Based on a comparison with other strategies, such as a baseline center-bias strategy or a pure object detection strategy (e.g., where all objects are treated with a positive saliency), the saliency database trained according to this disclosure outperforms either strategy, according to a pre-vision-recall (PR) curve, mean average precision (mAP), and linear correlation coefficients (CC) analysis.

Figure 2:
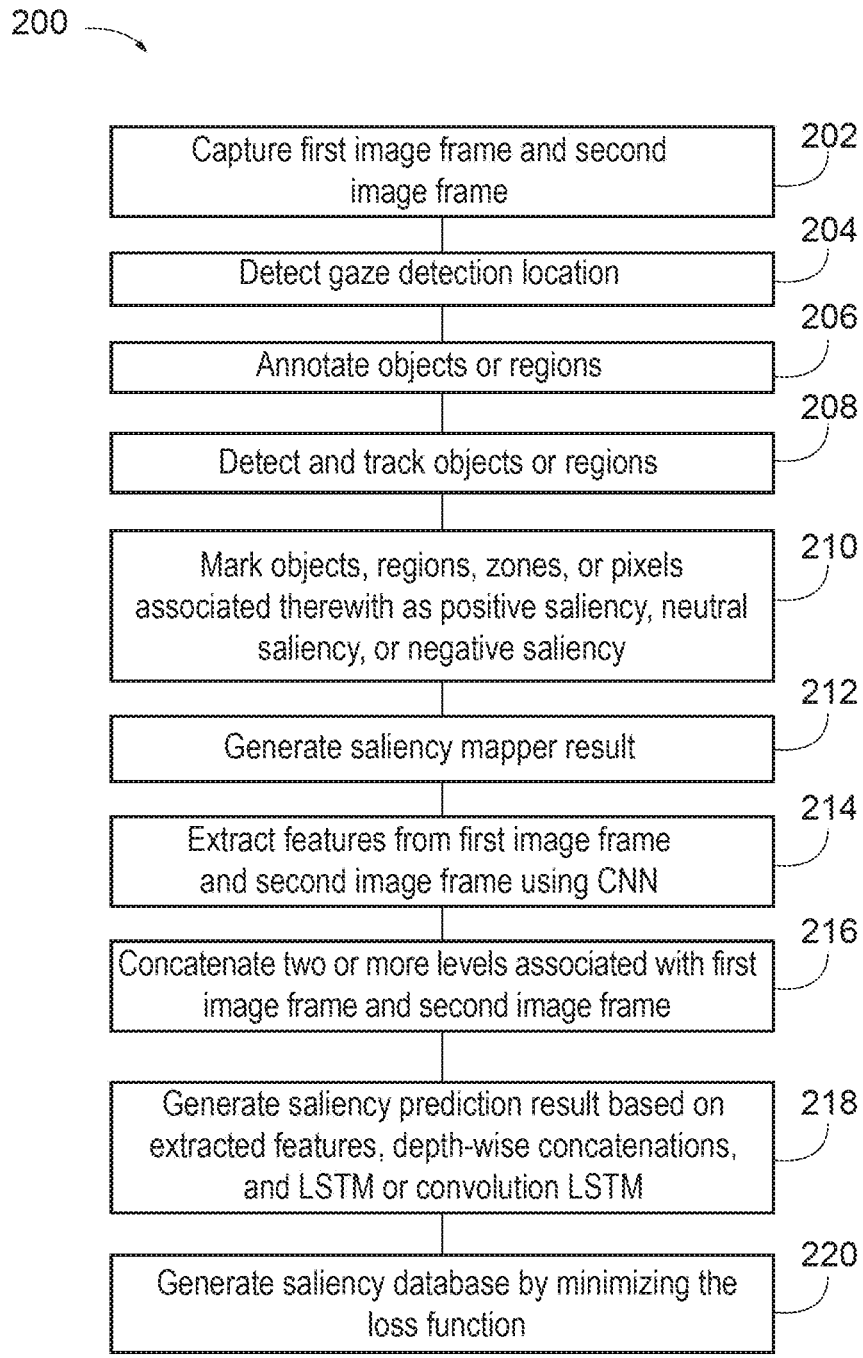
FIG. 2 is an exemplary flow diagram of a method for training saliency, according to one aspect.

FIG. 2 is an exemplary flow diagram of a method 200 for training saliency, according to one aspect. The method may include capturing 202 a first image frame at a first time and a second image frame at a second time of an operation environment in association with a training vehicle operated by a training driver. Additionally, the method may include detecting 204 a gaze detection location in association with the first image frame and a gaze detection location in association with the second image frame. The method may include annotating 206 objects or regions within the first image frame and the second image frame. The method may include detecting and tracking 208 the objects or regions within the first image frame and the second image frame. Further, the method may include marking 210 objects, regions, zones, or pixels associated therewith as positive saliency, neutral saliency, or negative saliency. As previously discussed the positive saliency may be indicative of the training driver being fixated on the object in the corresponding image frame, the neutral saliency may be indicative of the training driver being fixated on the object in a previous image frame, and the negative saliency may be any region not coinciding with the positive saliency or neutral saliency. The method may include generating 212 a saliency mapper result 152 based on the above.

The method may include extracting features 214 from the first image frame and extracting features from the second image frame at two or more levels using the CNN discussed above. The method may include concatenating 216 two or more of the levels associated with the first image frame and two or more of the levels associated with the second image frame. The method may include generating a saliency prediction result 154 218 based on the extracted features for the first image frame and the second image frame, the depth-wise concatenations associated with the first image frame and the second image frame, and the LSTM or convolution LSTM layer(s) or another RNN. The method may include generating the saliency database 220 by minimizing the loss function calculated between the saliency prediction result 154 and the saliency mapper result 152.

Figure 3:
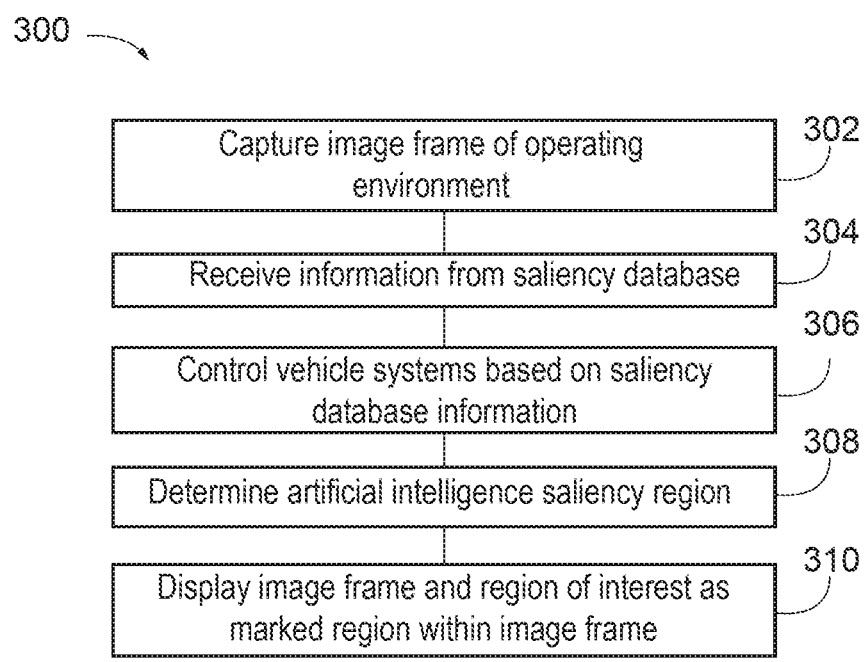
FIG. 3 is an exemplary flow diagram of a method for operating an autonomous vehicle based on saliency training, according to one aspect.

FIG. 3 is an exemplary flow diagram of a method 300 for operating an autonomous vehicle 170 based on saliency training, according to one aspect. The method for operating the autonomous vehicle 170 based on the saliency training may include capturing 302 an image frame of an operating environment, receiving 304 information from the saliency database 162, controlling 306 one or more vehicle systems 184 based on the information from the saliency database, determining 308 an artificial intelligence saliency region indicative of a region of interest based on the saliency database, and displaying 310 the image frame and the region of interest as a marked region within the image frame.

Figure 4:
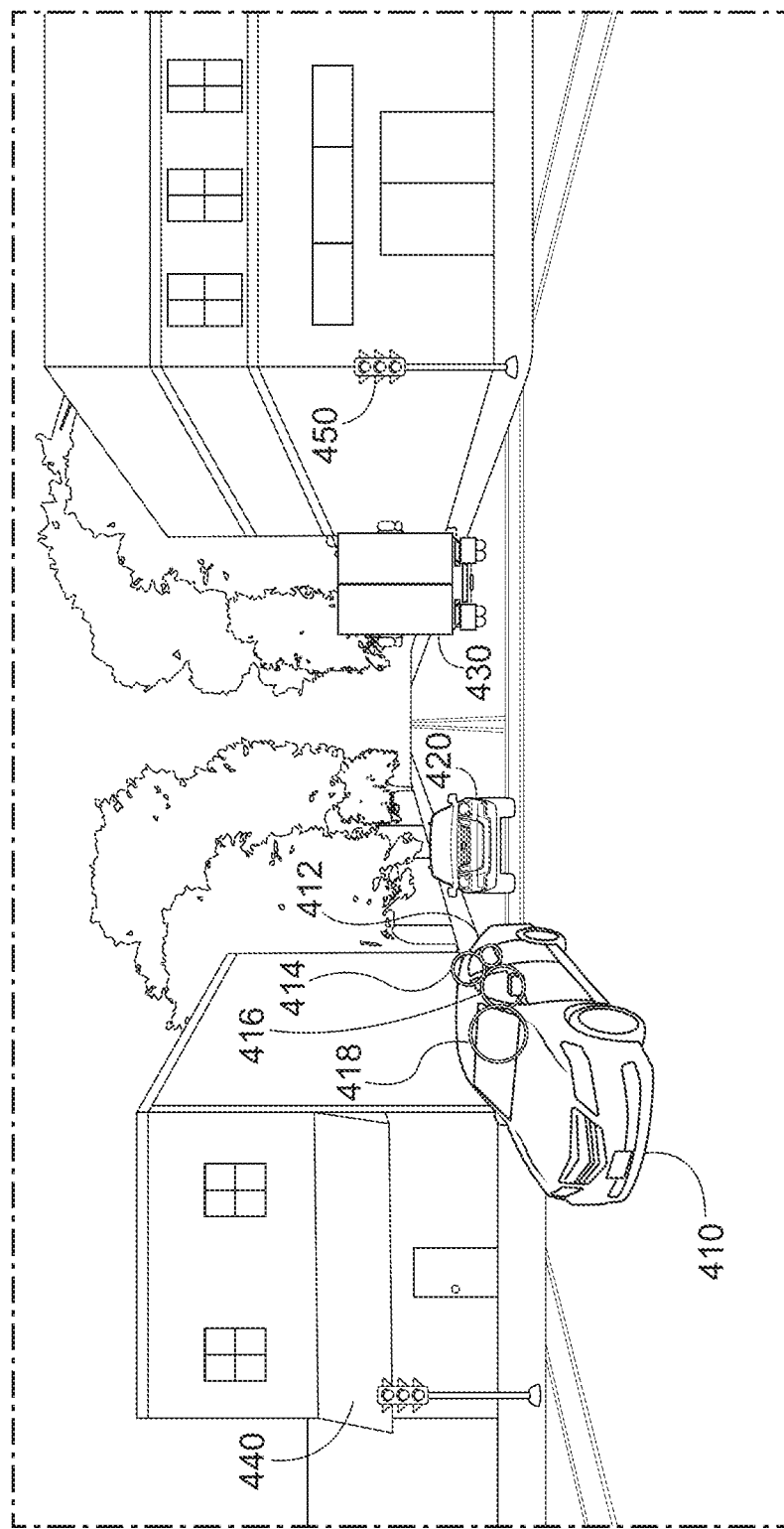
FIG. 4-6 are exemplary scenarios associated with saliency training, according to one aspect.
Figure 5:
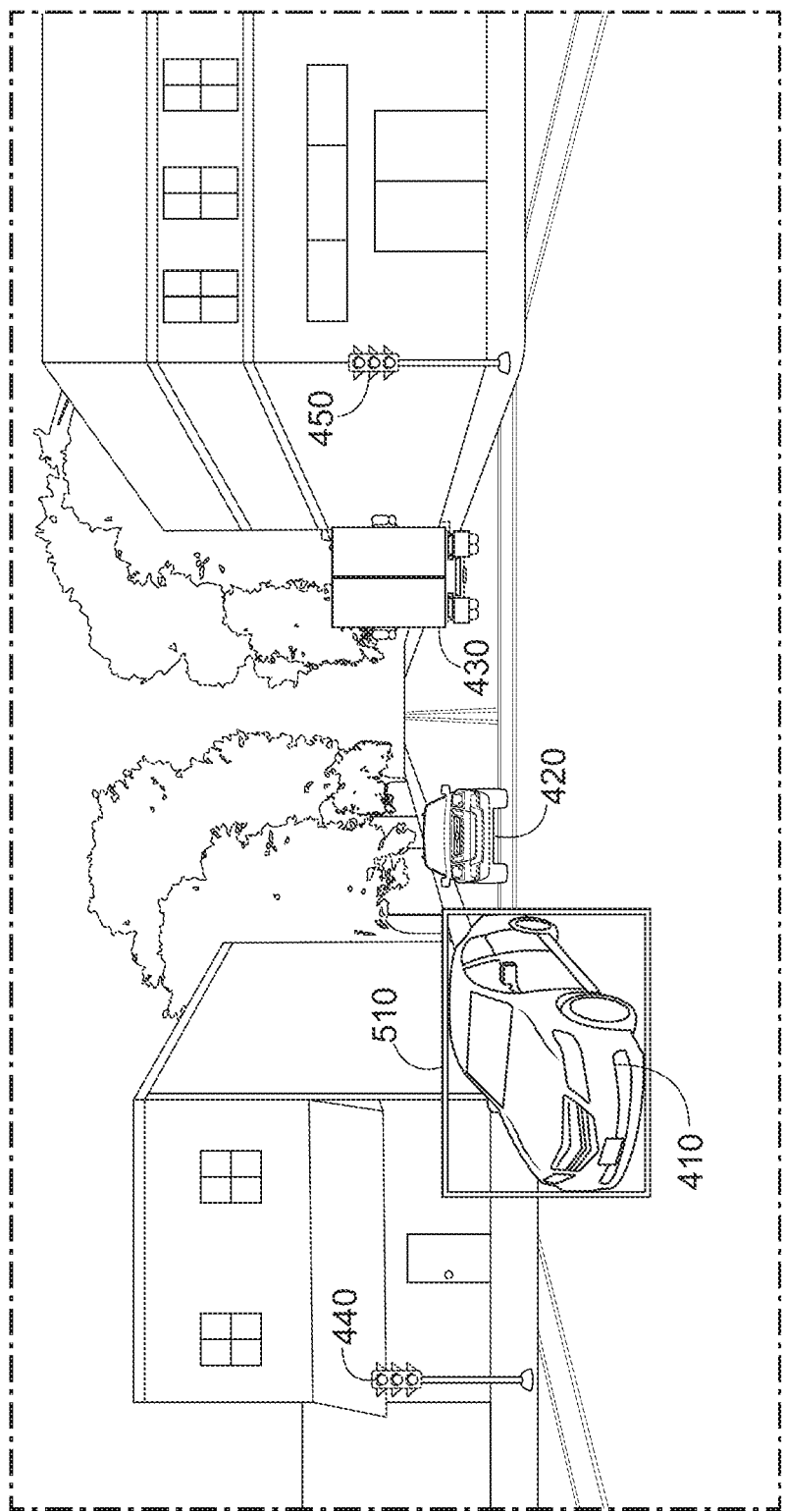
Figure 6:
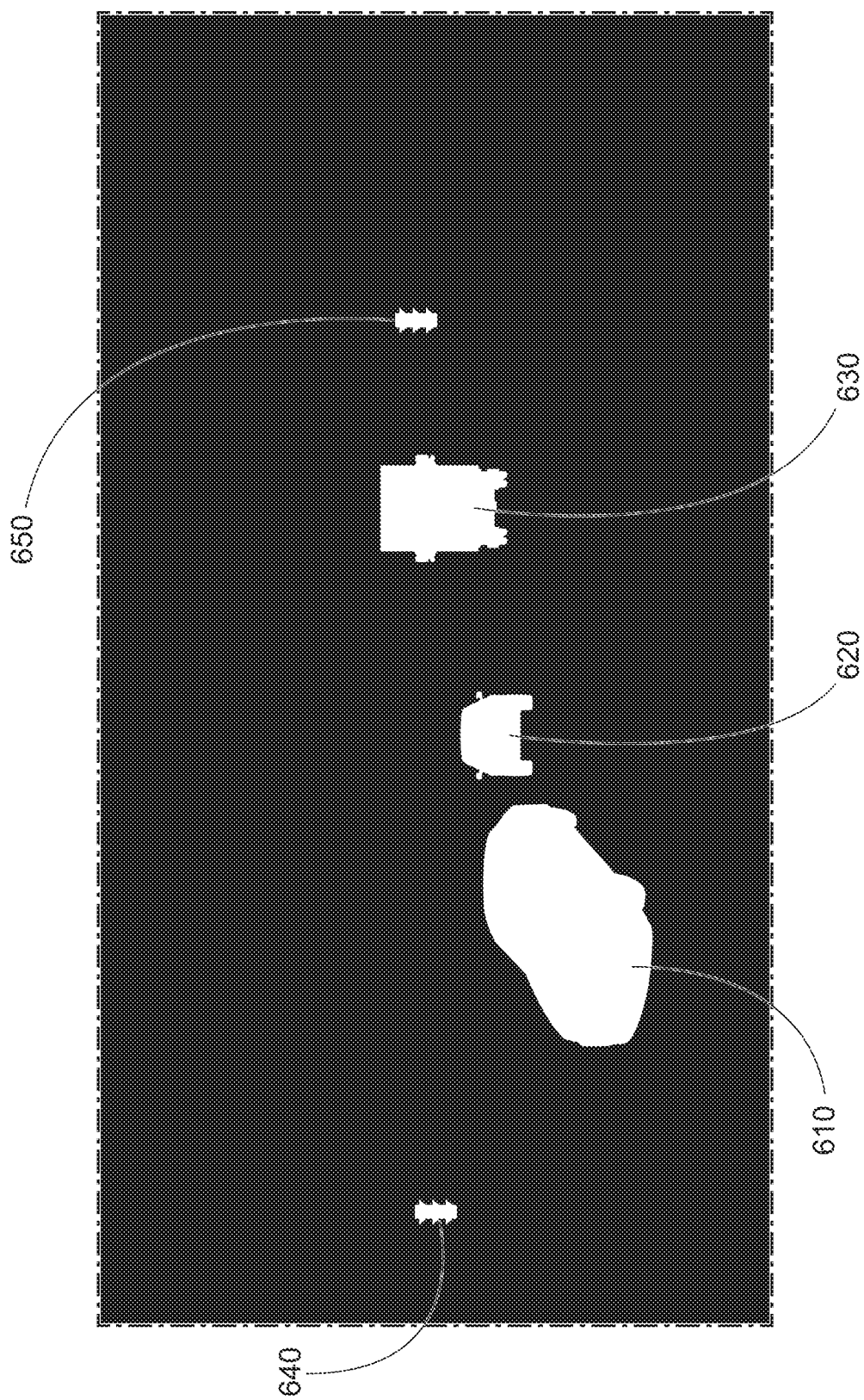

FIGS. 4-6 are exemplary scenarios associated with saliency training, according to one aspect. FIGS. 4-6 illustrate dataset generation and ground truth preparation for the ground truth database 124. FIG. 4 is an illustration of an operating environment captured as an image frame during the ground truth observation phase and associated with one or more times. In the operating environment of FIG. 4, there are three other vehicles (e.g., a first vehicle 410, a second vehicle 420, and a third vehicle 430). Additionally, within the operating environment, there are two traffic lights (e.g., a first traffic light 440 and a second traffic light 450). In this regard, the gaze detection sensor 112 may detect the detected gaze location at one or more times. For example, in FIG. 4, the gaze location of the training driver is tracked from time steps t-n to t (in this example, n=3). At time t-3, the detected gaze location of the training driver is at location 412. At time t-2, the detected gaze location of the training driver is at location 414. At time t-1, the detected gaze location of the training driver is at location 416. At time t, the detected gaze location of the training driver is at location 418. In this regard, because the locations 412, 414, 416, 418 are associated with the first vehicle 410, the annotator 114 may annotate the training driver as being fixated on the first vehicle 410, as will be discussed with reference to FIG. 5.

FIG. 5 is an illustration of the operating environment captured from FIG. 4, during the ground truth observation phase. In FIG. 5, the object associated with fixation of the training driver is annotated, as seen at box 510, which is indicative of a bounding box 510 determined based on gaze dynamics from the time t-n to t.

According to one aspect, instance level segmentation may be computed for each object within the image frame of FIG. 5. Additionally, a similarity index, intersection-over-union (IOU) may be computed between the annotated bounding box and the individual object segmentation masks. The instance level segmentation mask associated with the maximum IOU may be selected as the object of fixation. In this regard, FIG. 6 is an illustration of an exemplary saliency map indicative of saliency information highlighting positive saliency and neutral saliency objects from FIGS. 4-5. In other words, the objects of FIG. 6 (e.g., the first vehicle 610, the second vehicle 620, the third vehicle 630, the first traffic light 640, and the second traffic light 650) may be indicative of objects which correspond to the detected gaze location (during the range of time from t-n to t).

Figure 7:
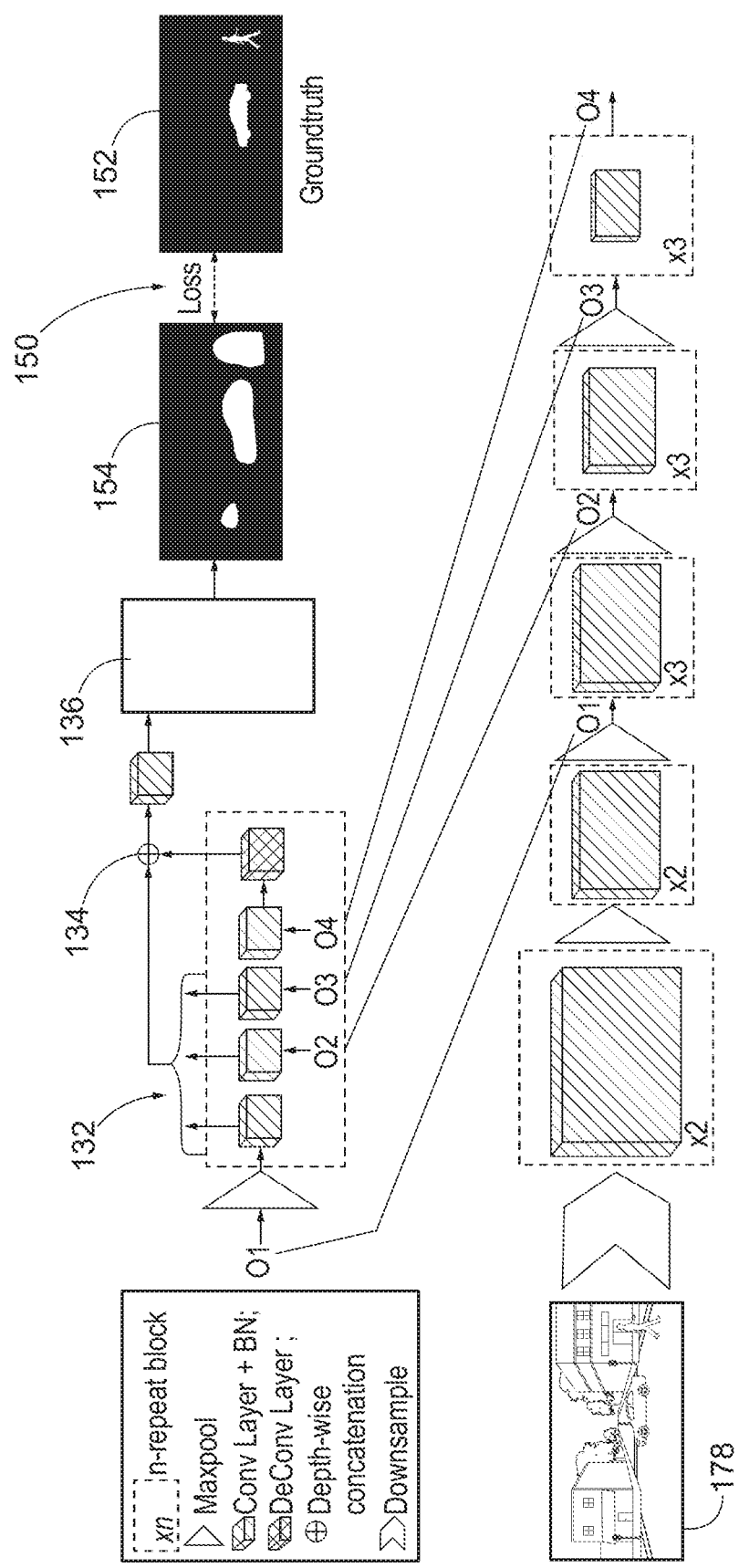
FIG. 7 is an exemplary component diagram of a system for training saliency, according to one aspect.

FIG. 7 is an exemplary component diagram of a system for training saliency, according to one aspect. As previously discussed, the image capture device 178 may capture a series of image frames of the operating environment at a series of time steps or times. In FIG. 7, it can be seen that at each time step, an image representation using a modified VGG architecture (e.g., feature extraction) may be fed to a two layer convolution LSTM (temporal learner 138) including a dropout layer.

According to one aspect, a single layer convolution LSTM may compute one or more hidden states H1, H2, . . . Ht and cell states C1, C2, . . . Ct given an input sequence of X1, X2, . . . Xt, using the following equations:

$it = \sigma(Wxi*Xt + Whi*Ht-1 + Wci \circ Ct-1 + bi)$ $ft = \sigma(Wxf*Xt + Whf*Ht-1 + Wcf \circ Ct-1 + bf)$ $Ct = ft \circ Ct-1 + it \circ \tan h(Wxc)*Xt + Whc*Ht-1 + bc$ $ot = \sigma(Wxo*Xt + Who*Ht-1 + Wco \circ Ct-1 + bo)$ $Ht = ot \circ \tan h(Ct)$ According to this aspect, it, ft, and ot are the input, forget, and output gates respectively. The symbol ∘ denotes the Hadamard product or the element-wise multiplication, and the symbol * denotes the convolution operation. Wh and Wx denote the hidden-to-state and the hidden-to-input convolution kernels, respectively. In FIG. 7, two-layer convolution LSTM with a kernel size of 3×3 is used, which output a saliency map for each time step.

One advantage of convolution (e.g., using convolution LSTM) is that the fully convolutional architecture of the system of FIG. 7 (e.g., there exists no fully-connected layer) is that center-bias concerns are mitigated. Because drivers are generally travelling in a forward driving direction, they may often stare forward, and thus, produce a center-biased detected gaze location. In this regard, CNN parameters, as well as the convolution LSTM parameters, such as Wh and Wx, may be utilized on the patch of the input Xt. Thus, the center-bias issue may be mitigated.

Parameters of the saliency database may be learned via minimizing the loss function, which is computed as the error between the estimated saliency map (saliency prediction result 154) and the ground truth (saliency mapper result 152). For example, the weighted mean square error between these two results may be minimized per Equation 1, discussed below. According to one aspect, the concept of neutral-pixels (e.g., excluding the positive/salient and negative/non-salient pixels) may be implemented so that loss associated with neutral pixels are not back propagated.

According to one aspect, error computation from the positive pixel and negative pixel area may be balanced. This balancing may be performed because there may be a larger population of negative pixels versus positive pixels. For example, this balancing may be incorporated in the calculation of weights $w^t$ based on the type of pixel (e.g., positive saliency, neutral saliency, or negative saliency), as shown Equation 2.

Given a training sample ($I^t$; $G^t$) of an image sequence $I^t$ with size h×w and ground truth sequence $G^t \in \{0, 1\}^{h \times w}$, the network estimates a saliency map $P^t \in [0,1]^{h \times w}$. Thus, the loss between given training sample and network estimation is given by Equation (1):

$\mathcal{L}(P,G) = 1/T \Sigma_{t=1}^{t=T} \Sigma_{i=1}^{h \times w} (\|g_i^t - p_i^t\|^2 * w_i^t)$ (Equation 1)

Where $g_i^t$ and $p_i^t$ are the ith pixel value in $G^t$ and $P^t$. T is the sequence length. $w_i^t$ is the weight associated with the ith pixel location and may be defined as follows (the superscript t is removed from the following notation):

$$w_i = \begin{cases} \frac{1}{ns}, & \text{if } i \in \text{salient or positive pixel} \\ \frac{1}{nn}, & \text{if } i \in \text{non salient or negative pixel} \\ 0, & \text{if } i \in \text{neutral pixel} \end{cases}$$ (Equation 2)

Where ns and nn are number of salient pixels and non-salient pixels per frame, respectively.

Figure 8A:
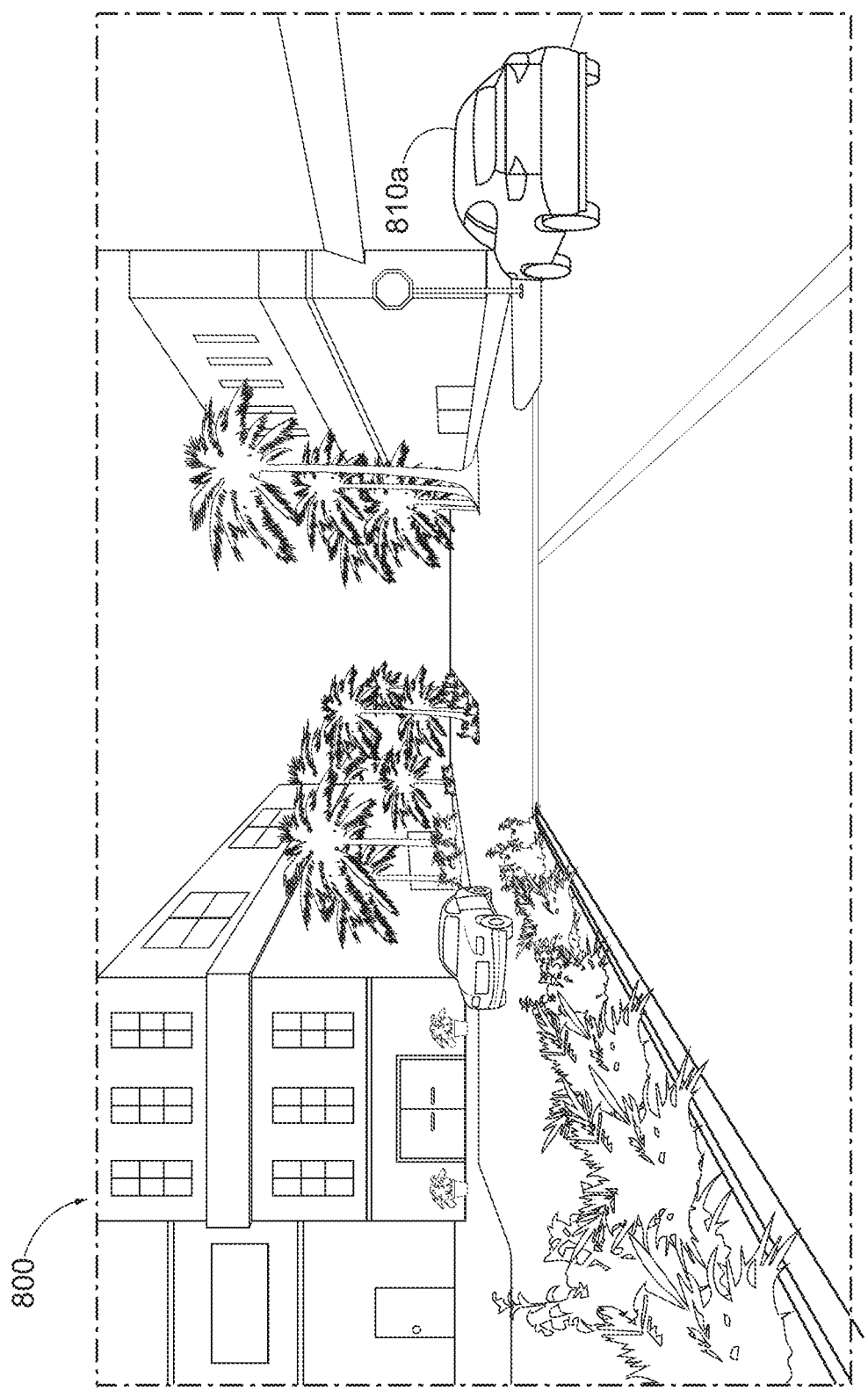
FIGS. 8A-8C are exemplary scenarios associated with saliency training, according to one aspect.
Figure 8B:
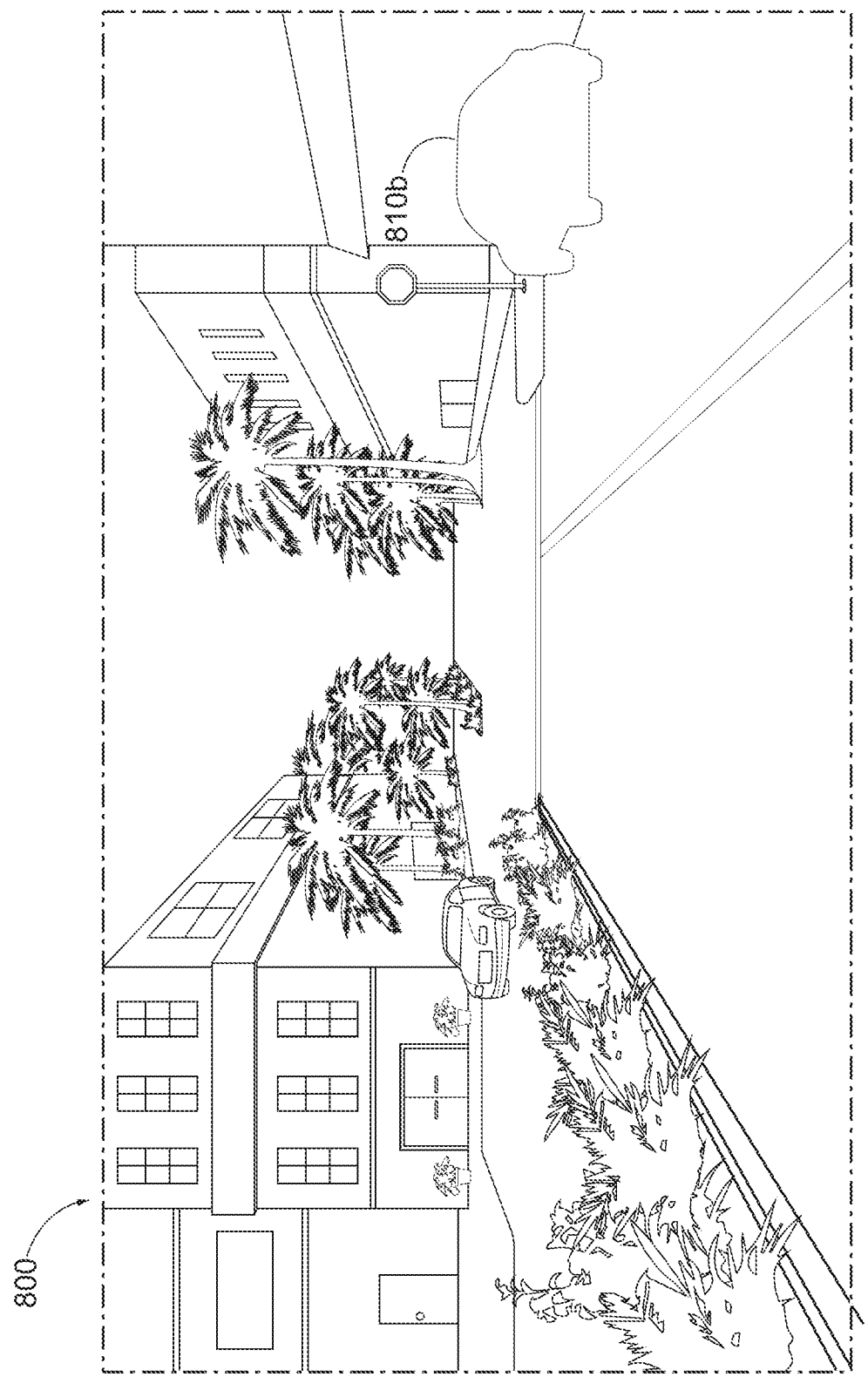
Figure 8C:
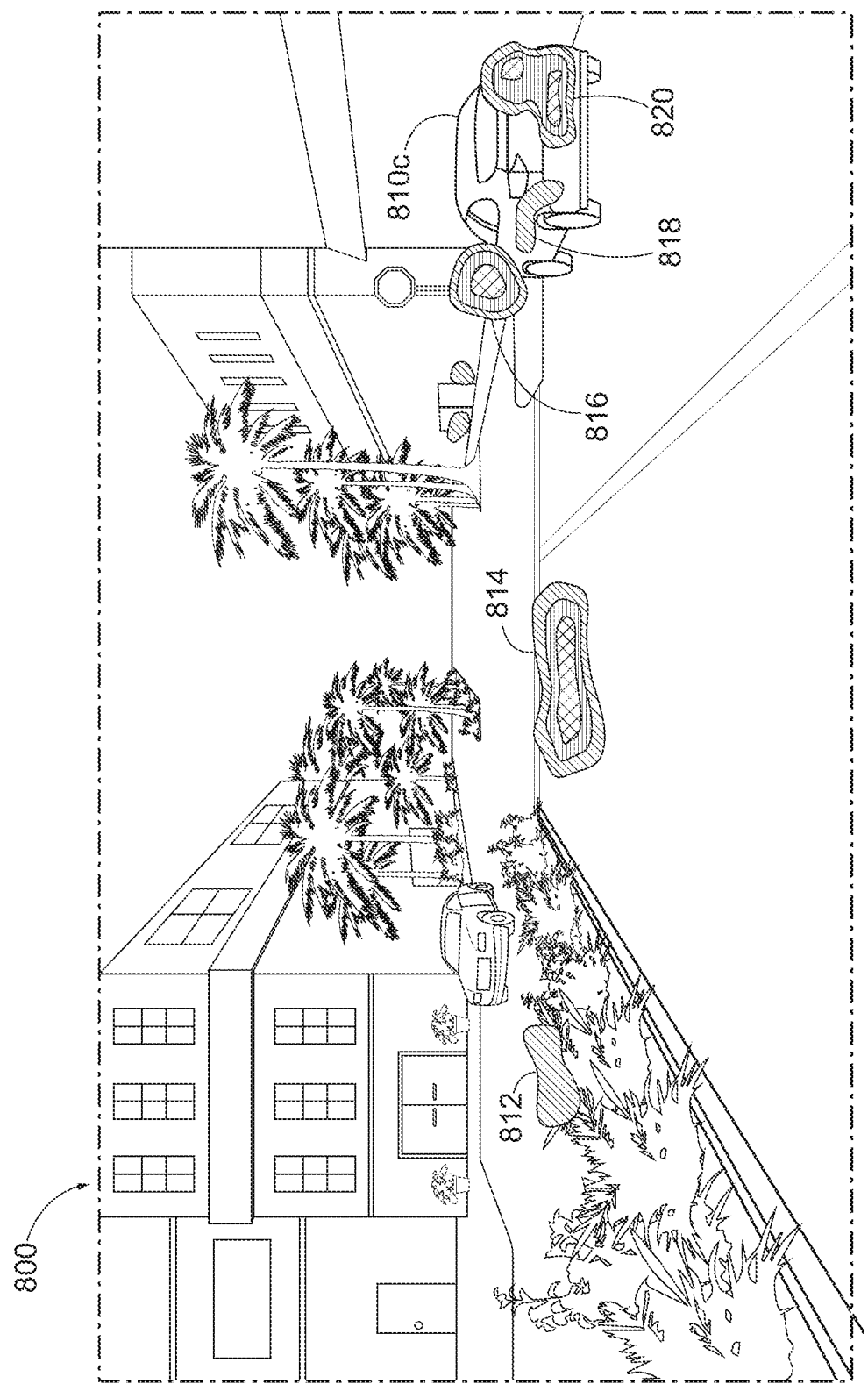
Figure 8D:
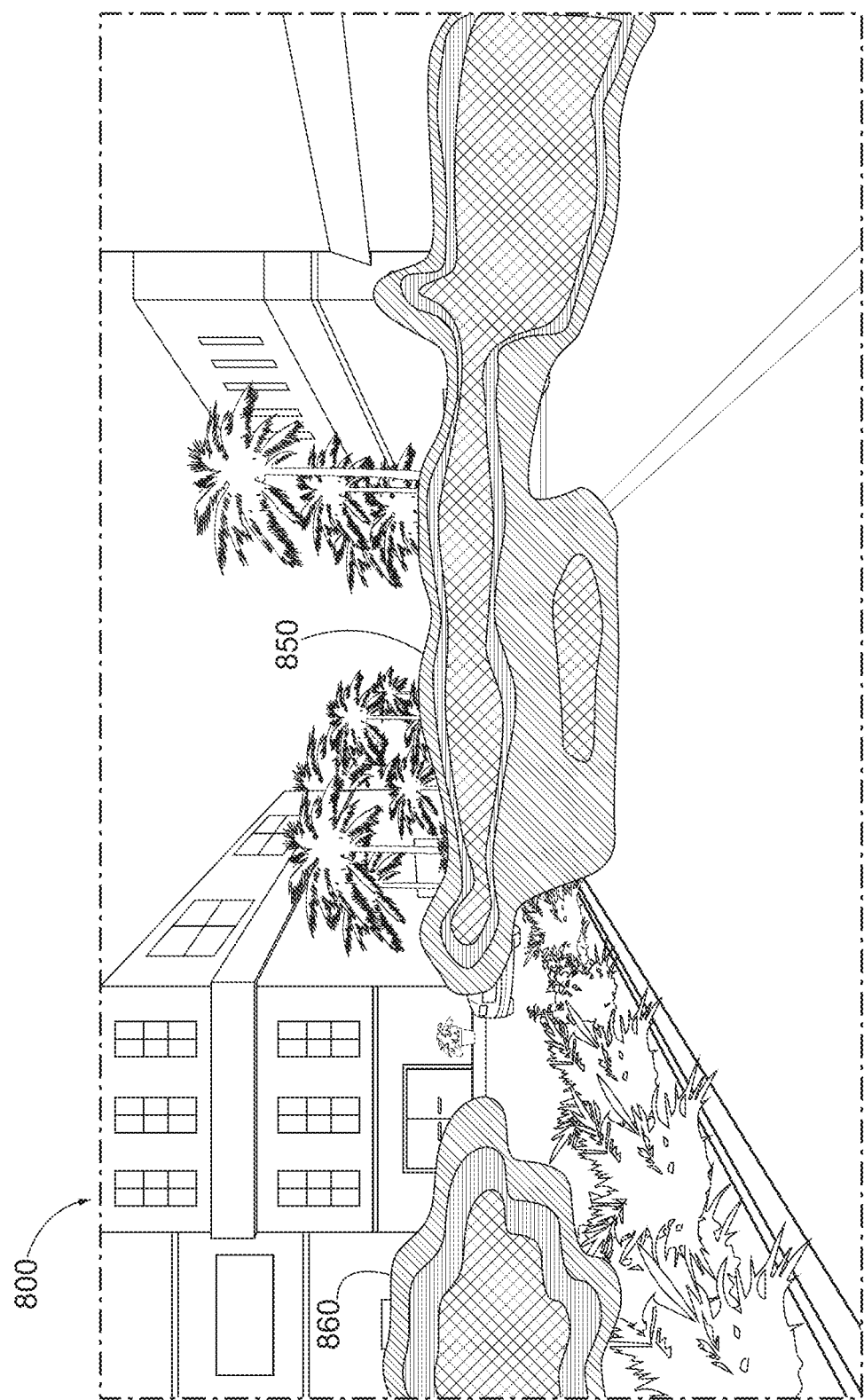
FIG. 8D is an exemplary scenario associated with baseline saliency training, according to one aspect.

FIGS. 8A-8C are exemplary scenarios associated with saliency training, according to one aspect. FIG. 8A is an exemplary image frame of an operating environment 800, captured by the image capture device 178 of the autonomous vehicle 170, and includes another vehicle 810a. FIG. 8B is an exemplary image frame of the operating environment 800, captured by the image capture sensor 102 of the ground truth observation system 110, and includes the vehicle 810b, as annotated by the ground truth observation system 110. FIG. 8D is an exemplary scenario associated with baseline saliency training, according to one aspect. FIG. 8C is an exemplary saliency map generated by the system 100 for training saliency, and provides a focused saliency estimation or prediction. Specifically, the saliency map generated in FIG. 8C recognizes user gaze area 812, relevant portions of the roadway, such as a pedestrian crossing near area 814, a stop sign near 816, and other road users or vehicles 810c, such as near areas 818 and 820.

FIG. 8D is an exemplary saliency map, which is a diffused saliency map provided with a baseline strategy and merely includes diffused regions of saliency 850, 860. Therefore, due to this diffusion and/or lack of focus, the saliency map of FIG. 8D would perform more poorly than the saliency map of FIG. 8C, which is an exemplary saliency map generated by the system 100 for training saliency, and provides a focused saliency estimation or prediction.

Figure 9:
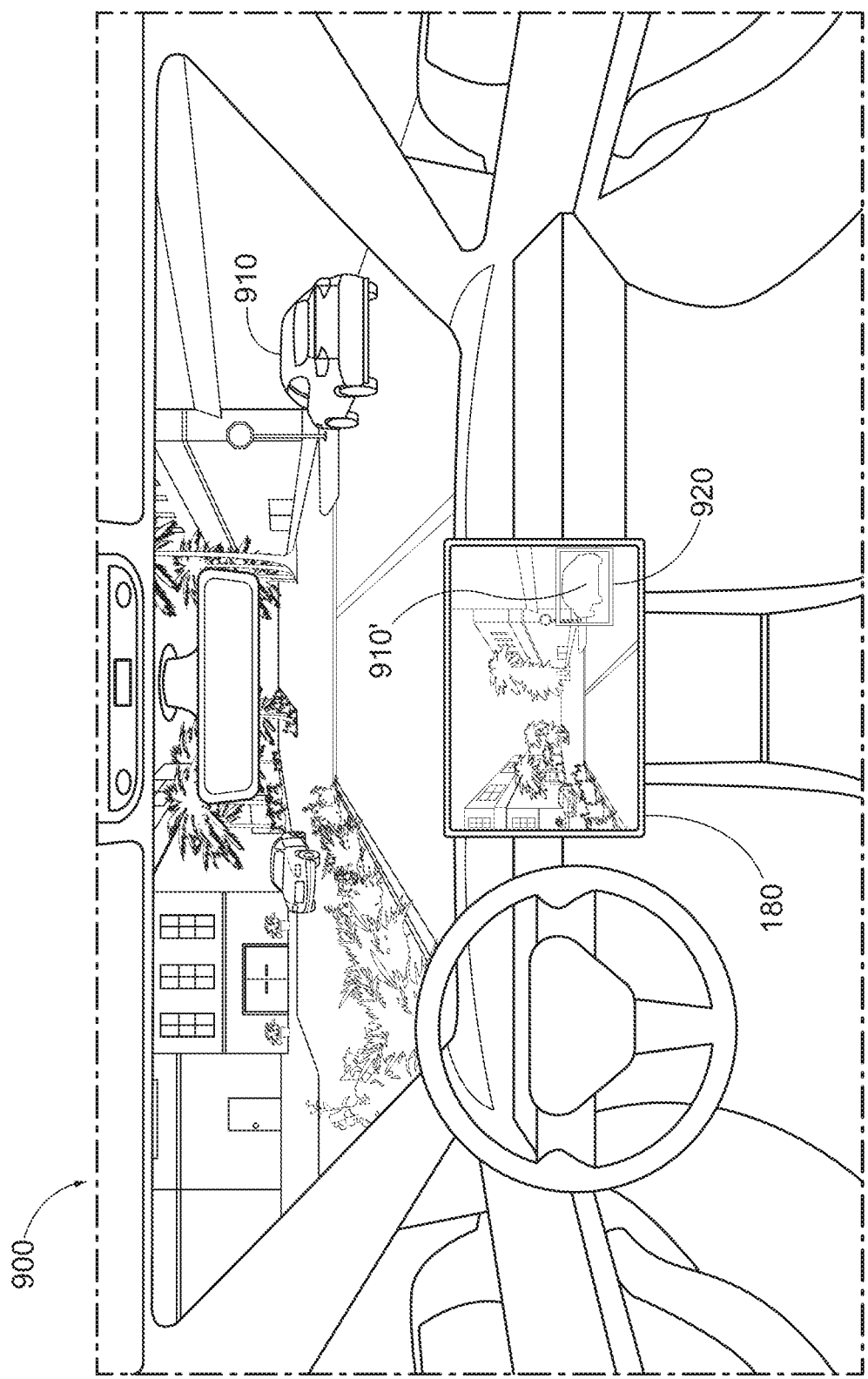
FIG. 9 is an exemplary autonomous vehicle operating based on saliency training, according to one aspect.

FIG. 9 is an exemplary autonomous vehicle operating based on saliency training, according to one aspect. As previously described, the autonomous vehicle 170 may display a region of interest within the operating environment 900 based on an image frame of the operating environment captured by the image capture device 178 and based on the trained saliency database. In this way, the controller 172 of the autonomous vehicle 170 may provide a saliency map or other saliency information based on the information from the saliency database and based on a given operating environment. In FIG. 9, another vehicle is detected by the vehicles systems of the autonomous vehicle 170, which may be operating in an autonomous mode. For example, the vehicle systems 184 of the autonomous vehicle 170 may include the aforementioned image capture device 178, which may capture an image frame of the scene of the operating environment 900. The controller 172 may detect objects within the scene, such as the other vehicle 910. Using the saliency information from the saliency database, the controller 172 may generate a saliency map or an artificial intelligence saliency indicative of a region of interest considered by the controller 172 in making decisions related to the autonomous operation of the autonomous vehicle 170. This may be seen by the marked region 920 within the graphical representation of the other vehicle 910' displayed by the display 180 of the autonomous vehicle 170.

One aspect may employ various artificial intelligence (AI) based schemes for carrying out various aspects thereof. One or more aspects may be facilitated via an automatic classifier system or process. A classifier may be a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

Figure 10:
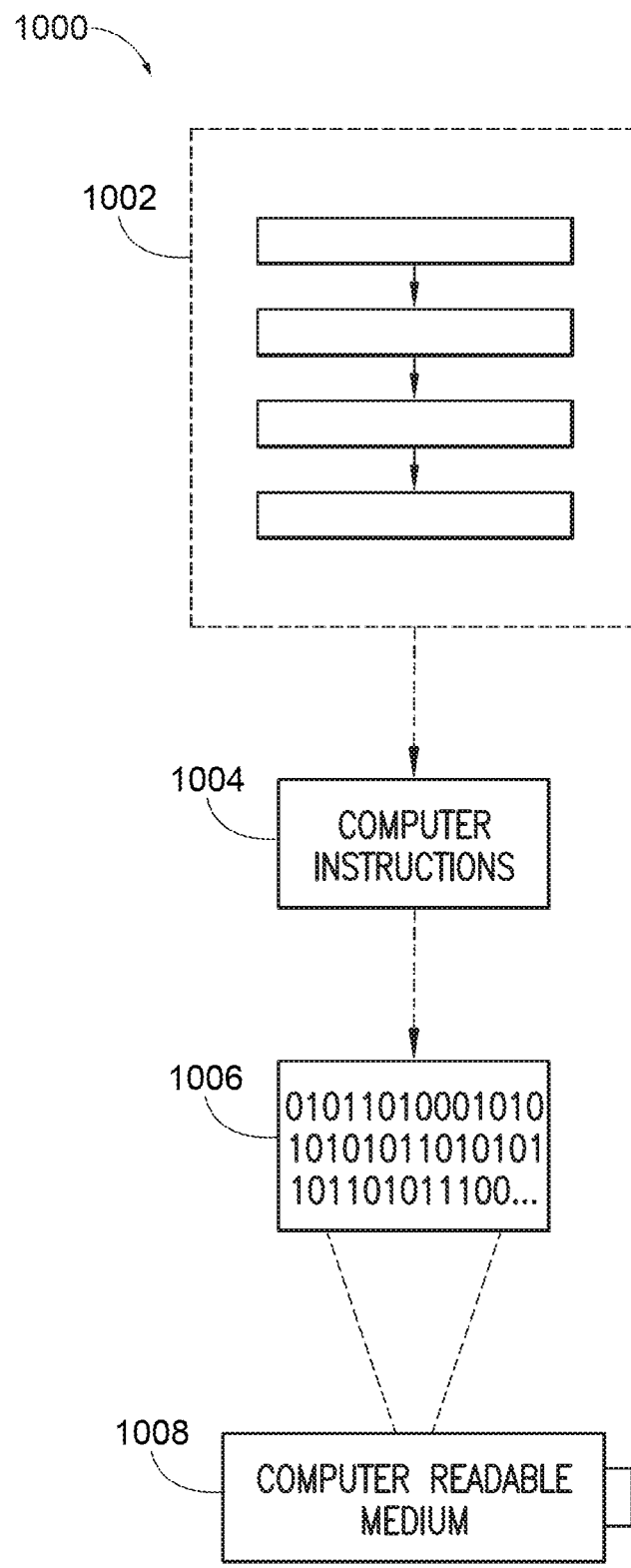
FIG. 10 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 10, wherein an implementation 1000 includes a computer-readable medium 1008, such as a CD-R, DVD-R, flash drive, a platter of a hard disk drive, etc., on which is encoded computer-readable data 1006. This encoded computer-readable data 1006, such as binary data including a plurality of zero's and one's as shown in 1006, in turn includes a set of processor-executable computer instructions 1004 configured to operate according to one or more of the principles set forth herein. In this implementation 1000, the processor-executable computer instructions 1004 may be configured to perform a method 1002, such as the method 200 of FIG. 2 or the method 300 of FIG. 3. In another aspect, the processor-executable computer instructions 1004 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 11:
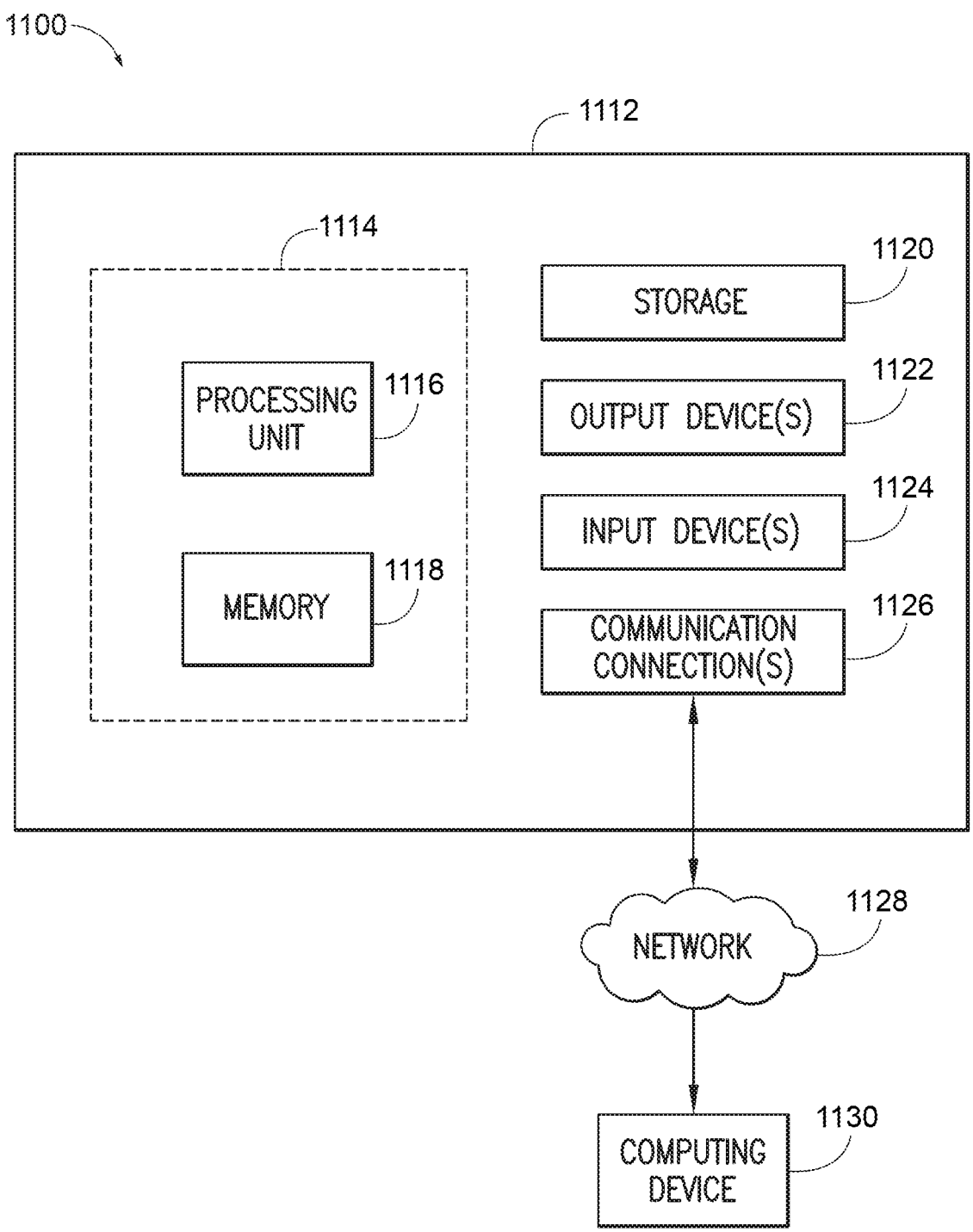
FIG. 11 is an illustration of an example computing environment where one or more of the provisions set forth herein are implemented, according to one aspect.

FIG. 11 and the following discussion provide a description of a suitable computing environment to implement aspects of one or more of the provisions set forth herein. The operating environment of FIG. 11 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 11 illustrates a system 1100 including a computing device 1112 configured to implement one aspect provided herein. In one configuration, the computing device 1112 includes at least one processing unit 1116 and memory 1118. Depending on the exact configuration and type of computing device, memory 1118 may be volatile, such as RAM, non-volatile, such as ROM, flash memory, etc., or a combination of the two. This configuration is illustrated in FIG. 11 by dashed line 1114.

In other aspects, the computing device 1112 includes additional features or functionality. For example, the computing device 1112 may include additional storage such as removable storage or non-removable storage, including, but not limited to, magnetic storage, optical storage, etc. Such additional storage is illustrated in FIG. 11 by storage 1120. In one aspect, computer readable instructions to implement one aspect provided herein are in storage 1120. Storage 1120 may store other computer readable instructions to implement an operating system, an application program, etc. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 1112. Any such computer storage media is part of the computing device 1112.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 1112 includes input device(s) 1124 such as keyboard, mouse, pen, voice input device, touch input device, infrared cameras, video input devices, or any other input device. Output device(s) 1122 such as one or more displays, speakers, printers, or any other output device may be included with the computing device 1112. Input device(s) 1124 and output device(s) 1122 may be connected to the computing device 1112 via a wired connection, wireless connection, or any combination thereof. In one aspect, an input device or an output device from another computing device may be used as input device(s) 1124 or output device(s) 1122 for the computing device 1112. The computing device 1112 may include communication connection(s) 1126 to facilitate communications with one or more other devices 1130, such as through network 1128, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for training saliency, comprising:
a ground truth database including a first image frame of an operation environment in association with a vehicle operated by a driver at a first time, a second image frame of the operation environment in association with the vehicle operated by the driver at a second time, and a saliency mapper result,
wherein the first image frame and the second image frame each include a detected gaze location of the driver and an object or a region,
wherein the saliency mapper result includes one or more of the following associated with the object or region of the second image frame:
a positive saliency indicative of the detected gaze location of the driver corresponding to the object or region at the second time;
a neutral saliency indicative of the detected gaze location of the driver corresponding to the object or region at the first time; and
a negative saliency indicative of a region not coinciding with the positive saliency or neutral saliency;
a saliency estimation system, including:
a feature extractor, implemented via a processor, extracting features for the first image frame and the second image frame at two or more levels based on a convolutional neural network (CNN);
a depth-wise concatenator, implemented via the processor, concatenating two or more of the levels associated with the first image frame and two or more of the levels associated with the second image frame, wherein a first level of the two or more levels is a pixel-level and a second level of the two or more levels is an object-level; and
a saliency predictor, implemented via the processor, generating a saliency prediction result based on the extracted features for the first image frame and the second image frame, the depth-wise concatenations associated with the first image frame and the second image frame, and a long short-term memory (LSTM) layer; and
a loss minimizer, implemented via the processor, generating a saliency database by minimizing a loss function calculated between the saliency prediction result and the saliency mapper result, wherein the saliency database is configured to be transmitted, at least in part, to an autonomous vehicle.

2. The system for training saliency of claim 1, comprising a gaze detection sensor detecting the detected gaze location of the driver at the first time for the first image frame and at the second time for the second image frame.

3. The system for training saliency of claim 1, wherein the object or the region is a manually annotated object, an annotated region, an instance level segmented object, or an intersection over union (IOU) object.

4. The system for training saliency of claim 3, comprising an instance level segmenter, implemented via the processor, defining the instance level segmented object of the first image frame or the second image frame.

5. The system for training saliency of claim 1, comprising an image capture sensor capturing the first image frame and the second image frame of the operation environment.

6. The system for training saliency of claim 1, comprising an observation controller, implemented via the processor, selecting the first image frame from a series of image frames based on a change in velocity of the vehicle or a change in brake pressure of the vehicle.

7. The system for training saliency of claim 1, wherein the saliency predictor generates the saliency prediction result based on a convolution LSTM layer or two or more LSTM layers.

8. The system for training saliency of claim 1, wherein the saliency predictor generates the saliency prediction result based on a dropout layer.

9. The system for training saliency of claim 1, wherein the saliency predictor generates the saliency prediction result based on a first convolution LSTM, a dropout layer, and a second convolution LSTM layer.

10. The system for training saliency of claim 1, wherein the saliency predictor generates the saliency prediction result based on a recurrent neural network (RNN).

11. The system for training saliency of claim 1, wherein the first image frame of the operation environment is an image of an intersection between a first roadway and a second roadway.

12. The system for training saliency of claim 1, wherein the first image frame of the operation environment is an image of an intersection including a four-way stop.

13. The system for training saliency of claim 1, wherein the first image frame of the operation environment is an image of an intersection including a pedestrian crossing.

14. The system for training saliency of claim 1, comprising a remote server storing the generated saliency database.

15. An autonomous vehicle operating based on a saliency database trained in accordance with a system for training saliency, comprising: a communications interface receiving information from the saliency database; one or more vehicle systems; and a controller, including a processor and a memory, controlling one or more of the vehicle systems in an autonomous fashion based on the saliency database, wherein the saliency database is trained based on minimizing a loss function calculated between a saliency prediction result from a saliency estimation system and a saliency mapper result from a ground truth database, wherein the saliency prediction result is generated based on features extracted from a first image frame and from features extracted from a second image frame, depth-wise concatenations associated with the first image frame and the second image frame, and a long short-term memory (LSTM) layer, wherein the features extracted from the first image frame and the second image frame are extracted at two or more levels based on a convolutional neural network (CNN) and wherein a first level of the two or more levels is a pixel-level and a second level of the two or more levels is an object-level, wherein the first image frame and the second image frame each include a detected gaze location of a training driver and an object or a region of a training operation environment in association with a training vehicle operated by the training driver, wherein the saliency mapper result includes one or more of the following associated with the object or region of the second image frame: a positive saliency indicative of the detected gaze location of the training driver corresponding to the object or region at a second time; a neutral saliency indicative of the detected gaze location of the training driver corresponding to the object or region at a first time; and a negative saliency indicative of a region not coinciding with the positive saliency or neutral saliency.

16. The autonomous vehicle of claim 15, comprising an image capture device capturing an image frame of an operation environment through which the autonomous vehicle is travelling, the image frame including an object or a region.

17. The autonomous vehicle of claim 16, wherein the controller associates an artificial intelligence saliency indicative of a region of interest corresponding to the object or region at a current time based on the saliency database.

18. The autonomous vehicle of claim 17, comprising a display displaying the image frame and the region of interest as a marked region within the image frame.

19. The autonomous vehicle of claim 17, wherein the controller controls one or more of the vehicle systems in the autonomous fashion based on the region of interest.

20. A system for training saliency, comprising:
a ground truth database including a first image frame of an operation environment in association with a vehicle operated by a driver at a first time, a second image frame of the operation environment in association with the vehicle operated by the driver at a second time, and a saliency mapper result,
wherein the first image frame and the second image frame each include a detected gaze location of the driver and an object or a region,
wherein the saliency mapper result includes one or more of the following associated with the object or region of the second image frame:
a positive saliency indicative of the detected gaze location of the driver corresponding to the object or region at the second time;
a neutral saliency indicative of the detected gaze location of the driver corresponding to the object or region at the first time; and
a negative saliency indicative of a region not coinciding with the positive saliency or neutral saliency;
a saliency estimation system, including:
a feature extractor, implemented via a processor, extracting features for the first image frame and the second image frame at two or more levels based on a convolutional neural network (CNN), wherein a first level of the two or more levels is a pixel-level and a second level of the two or more levels is an object-level;
a depth-wise concatenator, implemented via the processor, concatenating two or more of the levels associated with the first image frame and two or more of the levels associated with the second image frame; and
a saliency predictor, implemented via the processor, generating a saliency prediction result based on the extracted features for the first image frame and the second image frame, the depth-wise concatenations associated with the first image frame and the second image frame, and a recurrent neural network (RNN); and
a loss minimizer, implemented via the processor, generating a saliency database by minimizing a loss function calculated between the saliency prediction result and the saliency mapper result.

* * * * *